US012059122B2

(12) United States Patent
Heo

(10) Patent No.: US 12,059,122 B2
(45) Date of Patent: Aug. 13, 2024

(54) DUST COLLECTOR AND CLEANER HAVING THE SAME

(71) Applicant: Samsung Electronics Co., Ltd., Suwon-si (KR)

(72) Inventor: Kwangsu Heo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/704,779

(22) Filed: Mar. 25, 2022

(65) Prior Publication Data

US 2023/0022866 A1 Jan. 26, 2023

Related U.S. Application Data

(63) Continuation of application No. PCT/KR2022/004076, filed on Mar. 23, 2022.

(30) Foreign Application Priority Data

Jul. 23, 2021 (KR) ........................ 10-2021-0096850

(51) Int. Cl.

| | |
|---|---|
| ***A47L 9/16*** | (2006.01) |
| ***A47L 5/28*** | (2006.01) |
| ***B04C 3/00*** | (2006.01) |
| ***B04C 9/00*** | (2006.01) |

(52) U.S. Cl.

CPC ............... *A47L 9/1683* (2013.01); *A47L 5/28* (2013.01); *A47L 9/1608* (2013.01); *B04C 3/00* (2013.01); *B04C 9/00* (2013.01); *B04C 2009/007* (2013.01)

(58) Field of Classification Search

CPC .... A47L 9/1683; A47L 9/1675; A47L 9/1625; A47L 9/127; A47L 9/102; A47L 5/28; A47L 9/1608; B04C 3/00; B04C 9/00; B04C 2009/007

USPC ............................................................ 15/328

See application file for complete search history.

(56) References Cited

U.S. PATENT DOCUMENTS 10,750,914 B2 * 8/2020 Kim ....................... B01D 45/12
11,612,289 B2 3/2023 Yang et al.
2004/0098827 A1 * 5/2004 Oh ........................ A47L 9/1675 15/352
2005/0166351 A1 * 8/2005 Cunningham ........... H02K 7/14 15/314
2006/0117723 A1 * 6/2006 Yoo ....................... A47L 9/1683 55/428

FOREIGN PATENT DOCUMENTS

CN 2766964 Y 3/2006
JP 2003-010083 A 1/2003

(Continued)

OTHER PUBLICATIONS

International Search Report dated Jul. 18, 2022, issued in International Patent Application No. PCT/KR2022/004076.

*Primary Examiner* — Abbie E Quann

(74) *Attorney, Agent, or Firm* — Jefferson IP Law, LLP

(57) ABSTRACT

A cleaner is provided. The cleaner includes a suction head, a dust collector connected to the suction head, and a fan motor provided to generate a suction force inside the dust collector, wherein the dust collector comprises a housing having an inlet and an outlet, a fixed body arranged inside the housing, and a rotating body rotatably provided between the housing and the fixed body. the housing and the fixed body.

15 Claims, 11 Drawing Sheets

(56) References Cited

FOREIGN PATENT DOCUMENTS

| | | | |
|---|---|---|---|
| JP | 2003-204903 | A | 7/2003 |
| JP | 2014-100276 | A | 6/2014 |
| KR | 10-2004-0044296 | A | 5/2004 |
| KR | 10-0800188 | B1 | 2/2008 |
| KR | 10-2009-0099850 | A | 9/2009 |
| KR | 10-0941429 | B1 | 2/2010 |
| KR | 10-1653481 | B1 | 9/2016 |
| KR | 10-2021-0038450 | A | 4/2021 |

* cited by examiner

DUST COLLECTOR AND CLEANER HAVING THE SAME

CROSS-REFERENCE TO RELATED APPLICATION(S)

This application is a continuation application, claiming priority under § 365(c), of an International application No. PCT/KR2022/004076, filed on Mar. 23, 2022, which is based on and claims the benefit of a Korean patent application number 10-2021-0096850, filed on Jul. 23, 2021, in the Korean Intellectual Property Office, the disclosure of which is incorporated by reference herein in its entirety.

BACKGROUND

1. Field

The disclosure relates to a dust collector and a cleaner having the same. More particularly, the disclosure relates to a dust collector having an improved structure and a cleaner having the same.

2. Description of Related Art

A vacuum cleaner is a device that cleans a room by removing rubbish or debris in the room, and is generally used at home. The vacuum cleaner suctions air using a suction force of a fan motor unit, and separates the rubbish or debris in the suctioned air using a device, such as a filter to keep the room clean. Vacuum cleaners may include a canister type vacuum cleaner and an upright type vacuum cleaner, and in recent years, there is popularization of a robot vacuum cleaner that runs through a cleaning area without user manipulation and performs cleaning by suctioning rubbish or debris from a surface to be cleaned.

The vacuum cleaner includes a dust collector in which rubbish or debris contained in the suctioned air is subject to filtering such that the rubbish or debris is filtered out by a predetermined filtering device. Filtering devices for filtering rubbish or debris in a dust collector include a porous filter device that forcibly filters rubbish or debris as air passes through a porous filter, and a cyclone-type filter device that filters rubbish or debris in a cyclone flow of air.

The cyclone-type dust collector uses a centrifugal force to separate particles contained in gas, and the centrifugal force is proportional to the third power of the diameter of a particle, so that the dust collection efficiency may be lowered in proportion to the decreasing size of the particle.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a cleaner capable of improving the dust collection efficiency.

Another aspect of the disclosure is to provide a cleaner capable of minimizing reduction in the dust collection efficiency even when the particle size is small.

Additional aspects will be set forth in part in the description which follows and, in part, will be apparent from the description, or may be learned by practice of the presented embodiments.

In accordance with an aspect of the disclosure, a cleaner is provided. The cleaner includes a suction head, a dust collector connected to the suction head, and a fan motor provided to generate a suction force inside the dust collector, wherein the dust collector comprises a housing having an inlet and an outlet, a fixed body arranged inside the housing, and a rotating body rotatably provided between the housing and the fixed body.

The dust collector may further comprise a driving device provided to generate a driving force for rotating the rotating body.

The driving device may be configured to generate a torque according to a rotational axis that is parallel to a direction of an airflow flowing into the dust collector.

The fixed body may comprise a first fixed element arranged between the driving device and the inlet, and a second fixed element arranged between the driving device and the outlet.

The inlet, the driving device, and the outlet may be arranged in a line.

The driving device may be provided to adjust a rotational speed of the rotating body such that lift is greater than a centrifugal force generated according to a rotation of the rotating body.

The rotating body may be provided to rotate about a rotational axis that may extend along a direction in which air flowing into the dust collector is discharged.

The fixed body may comprise a plurality of holes formed through an outer circumferential surface of the fixed body.

The fixed body may comprise a plurality of slits formed through an outer circumferential surface of the fixed body and extending parallel to a direction of a rotational axis of the rotating body.

The plurality of slits may be formed to be inclined with respect to a radial direction of the fixed body.

The dust collector may further comprise a guide provided on the fixed body to generate a spiral flow between the fixed body and the rotating body.

The dust collector may further comprise an impeller that is provided to be rotated by the suction force of the fan motor unit to rotate the rotating body.

The dust collector may comprise a first flow path formed between the fixed body and the rotating body, and a second flow path formed between the rotating body and the housing.

The dust collector may comprise a first dust collecting chamber formed inside the fixed body, and a second dust collecting chamber formed outside the fixed body.

In accordance with another aspect of the disclosure, a dust collector is provided. The dust collector includes a housing having an inlet and an outlet, a fixed body arranged inside the housing, a rotating body rotatably provided between the housing and the fixed body, and a driving device provided to generate a driving force for rotating the rotating body.

The fixed body may comprise a plurality of holes formed through an outer circumferential surface of the fixed body.

The fixed body may comprise a plurality of slits formed through an outer circumferential surface of the fixed body and extending parallel to a direction of a rotational axis of the rotating body.

The dust collector may further include a guide provided on the fixed body to generate a spiral flow between the fixed body and the rotating body.

The dust collector may further include a first flow path formed between the fixed body and the rotating body, and a second flow path formed between the rotating body and the housing.

The rotating body may be provided to rotate about a rotational axis that extends along a direction in which air introduced through the inlet is discharged.

The guide may comprise a plurality of guides arranged along an outer circumferential surface of the fixed body.

The plurality of guides may have a curved shaped, and the plurality of guides may be formed to generate a spiral flow in an airflow that does not pass through a second flow path.

The rotating body may be configured to remove debris passing through the first flow path by collecting it at a side of the rotating body.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings.

The same reference numerals are used to represent the same elements throughout the drawings.

DETAILED DESCRIPTION

Figure 1:
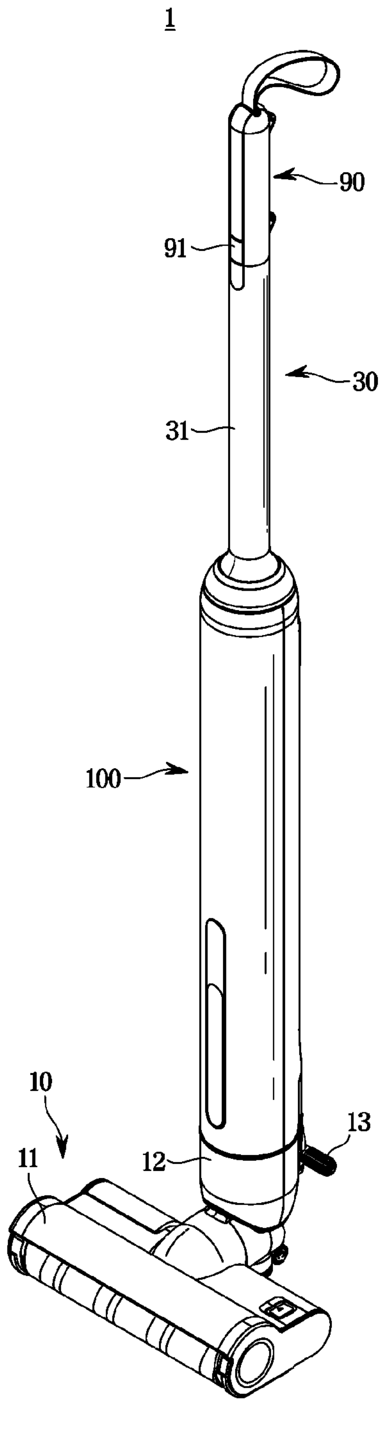
FIG. 1 is a view illustrating a cleaner according to an embodiment of the disclosure.

The following description with reference to the accompanying drawings provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise.

Further, identical symbols or numbers in the drawings of the disclosure denote components or elements configured to perform substantially identical functions.

Further, terms used herein are only for the purpose of describing particular embodiments and are not intended to limit to the disclosure. The singular form is intended to include the plural form as well, unless the context clearly indicates otherwise. It should be further understood that the terms "include," "including," "have," and/or "having" specify the presence of stated features, integers, steps, operations, elements, components, and/or groups thereof, but do not preclude the presence or addition of one or more other features, integers, steps, operations, elements, components, and/or groups thereof.

Further, it should be understood that, although the terms "first," "second," etc. may be used herein to describe various elements, the elements are not limited by the terms, and the terms are only used to distinguish one element from another. For example, a first element could be termed a second element, and similarly, a second element could be termed a first element without departing from the scope of the disclosure. The term "and/or" includes combinations of one or all of a plurality of associated listed items.

Hereinafter, an embodiment according to the disclosure will be described in detail with reference to the accompanying drawings. In FIG. 1, a portion in which a suction head 10 is arranged may be defined as a front portion, and a portion in which a handle 90 is arranged may be defined as a rear portion. That is, it may be defined that air is introduced from the front of the cleaner 1 and discharged to the rear. However, the shapes and positions of components are not limited by the terms.

Figure 2:
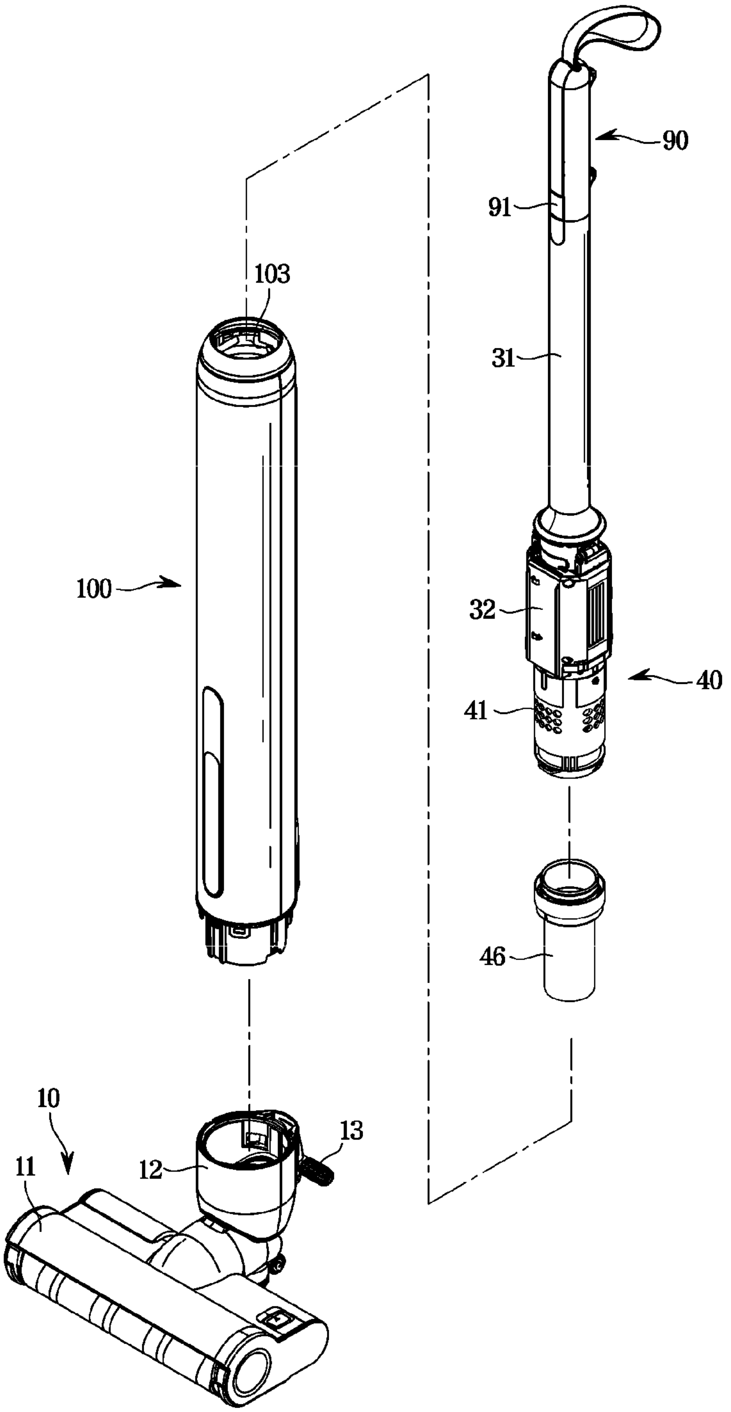
FIG. 2 is an exploded view illustrating the cleaner shown in FIG. 1 according to an embodiment of the disclosure.

FIG. 1 is a view illustrating a cleaner according to an embodiment of the disclosure. FIG. 2 is an exploded view illustrating the cleaner shown in FIG. 1 according to an embodiment of the disclosure.

Referring to FIGS. 1 and 2, a cleaner 1 may include a suction head 10 provided to suction rubbish or debris, such as hair, on a surface to be cleaned by a suction force of air, a dust collector 100 connected to the suction head 10, and a main body 30 connected to the dust collector 100.

The suction head 10 is provided to suction rubbish or debris, such as dust, existing on the surface to be cleaned while moving on the surface to be cleaned. The suction head 10 may include a head assembly 11, a neck portion 12, and a head switch 13.

The head assembly 11 may be provided at an inside thereof with an air flow path. The air flow path formed inside the head assembly 11 may communicate with the dust collector 100 through the neck portion 12. External air and rubbish or debris introduced through the head assembly 11 may be moved into the dust collector 100 through the neck portion 12.

The neck portion 12 may be connected to a lower end portion of the dust collector 100. The neck portion 12 may be rotatably coupled to the head assembly 11. As the neck portion 12 rotates with respect to the head assembly 11, the head assembly 11 may rotate with respect to the dust collector 100 connected to the neck portion 12. Accordingly, the cleaner 1 may have an increased degree of freedom in driving.

The head switch 13 is provided to fix the coupling state between the suction head 10 and the dust collector 100 or release the fixation. The user may operate the head switch 13 to separate the dust collector 100 from the suction head 10. Because the head switch 13 is arranged on the suction head 10, the user may separate the dust collector 100 from the suction head 10 by operating the head switch 13 using the feet without bending over.

The dust collector 100 may form a part of the external appearance of the cleaner 1. The dust collector 100 may have one end 102 mounted on the suction head 10. The dust collector 100 may include a hollow 103 into which the main body 30 is inserted.

The main body 30 may be coupled to the dust collector 100. The main body 30 may include an extension portion 31 forming a part of the external appearance of the cleaner 1. The extension portion 31 may have a space at an inside to accommodate an electric wire that is unrolled toward a manipulation switch 91.

The extension portion 31 may be provided at a rear end thereof with a handle 90. During use of the cleaner 1, the handle 90 may be gripped by the user for the suction head 10 to be pulled or pushed.

The handle 90 may be provided with the manipulation switch 91 for controlling the operation of the cleaner 1. The manipulation switch 91 is provided to receive a command for operating the cleaner 1 from the user. The manipulation switch 91 may be arranged adjacent to the handle 90 such that the user may operate the cleaner 1 while moving the cleaner 1 during cleaning.

The main body 30 may include a battery mounting portion 32. The battery mounting portion 32 may mount a battery thereon. The battery may be provided as one battery or two or more batteries. The battery mounting portion 32 may be located inside the dust collector 100.

The main body 30 may be provided with a fan motor unit 40 configured to generate a suction force required to suction rubbish or debris on the surface to be cleaned. The fan motor unit 40 may be configured such that external air is introduced through the suction head 10 and then passes through the dust collector 100. The fan motor unit 40 mounted on the main body 30 may be arranged inside the dust collector 100. The fan motor unit 40 may include a fan motor.

The fan motor unit 40 may be provided to generate a suction force inside the dust collector 100. An air passed through a motor filter 46 may pass through the fan motor unit 40 and flow out of the cleaner 1.

The cleaner 1 according to the embodiment of the disclosure may be provided such that a portion of the main body 30 in which the fan motor unit 40 is arranged is divided from the battery mounting portion 32. That is, the air forced to flow by the fan motor unit 40 may not move to the battery mounting portion 32 and the handle 90 but may flow out directly through a motor exhaust port 41 and an exhaust port (not shown) of the dust collector 100. Accordingly, the cleaner 1 according to the embodiment of the disclosure may minimize the discharge of air toward the user.

The motor filter 46 may be provided in the main body 30. The motor filter 46 may be provided to filter out the rubbish or debris in the air again before the air is introduced into the fan motor unit 40. The motor filter 46 may be arranged at a front side of the fan motor unit 40 in a direction in which air is discharged. The motor filter 46 may be provided as a mesh member. The cleaner 1 according to the embodiment of the disclosure may prevent the fan motor unit 40 from being damaged by rubbish, debris and the like and discharge relatively clean air by using the motor filter 46.

Figure 3:
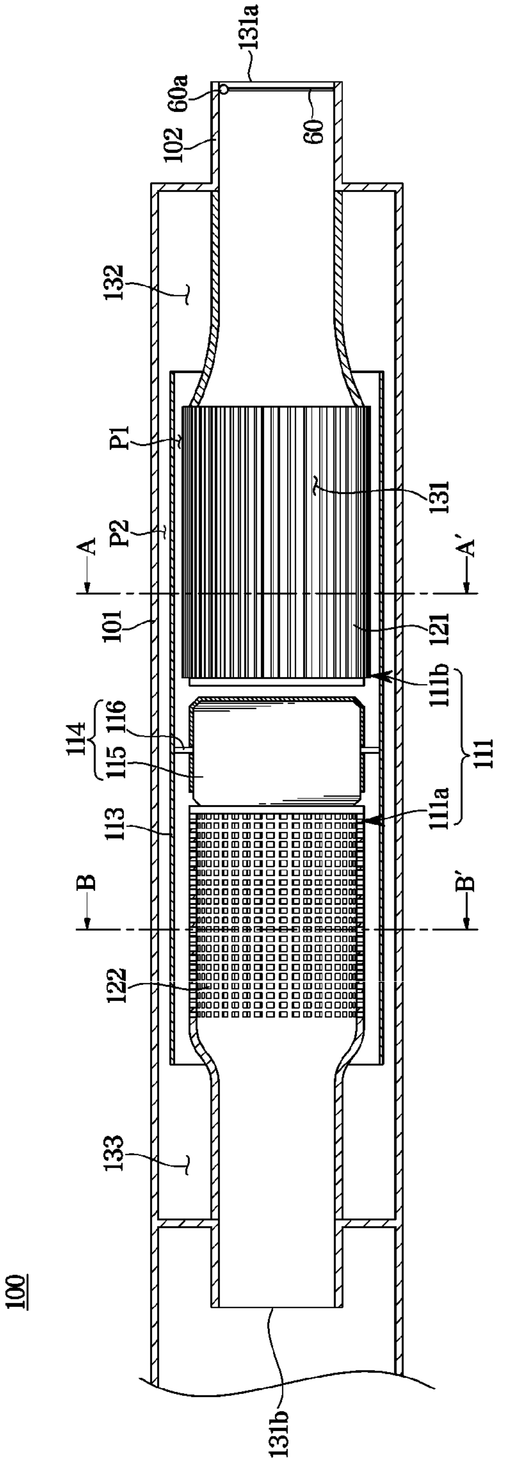
FIG. 3 is a view illustrating a portion of a cross section of a dust collector shown in FIG. 2 according to an embodiment of the disclosure.
Figure 4:
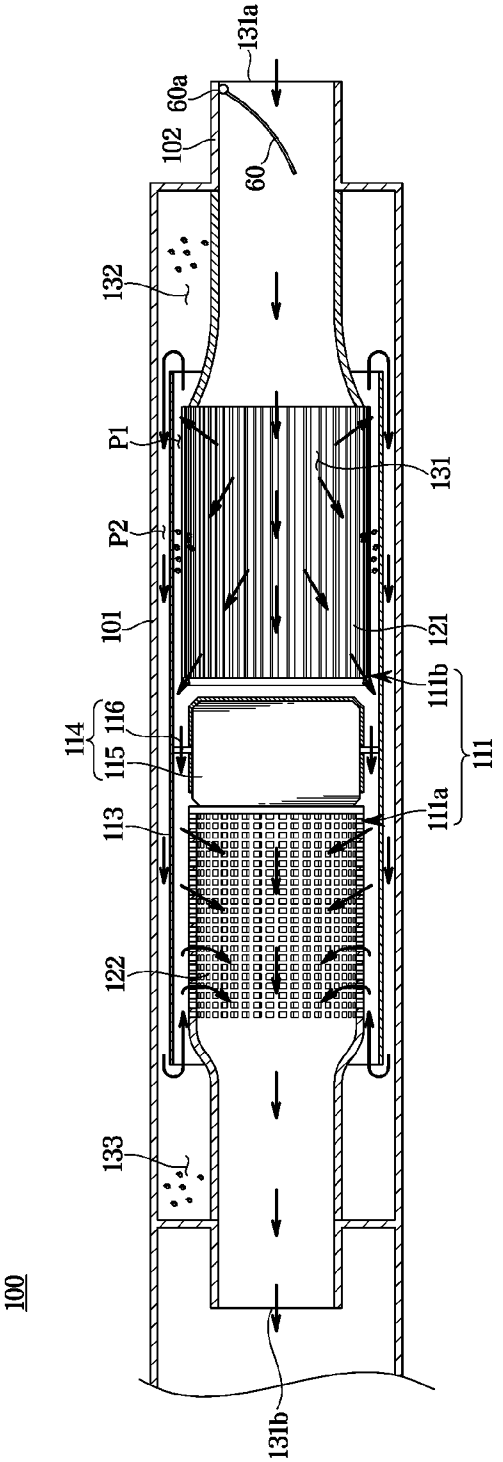
FIG. 4 is a view illustrating an airflow inside a dust collector generated by a fan motor unit shown in FIG. 2 according to an embodiment of the disclosure.
Figure 5:
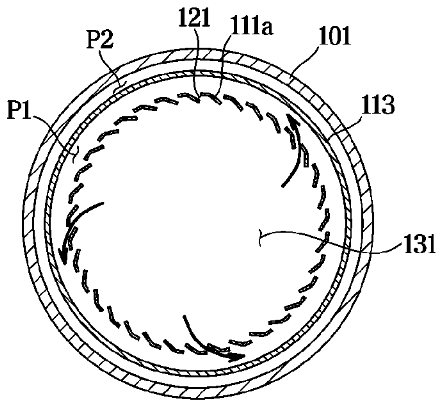
FIG. 5 is a cross-sectional view taken along line A-A' shown in FIG. 3 according to an embodiment of the disclosure.
Figure 6:
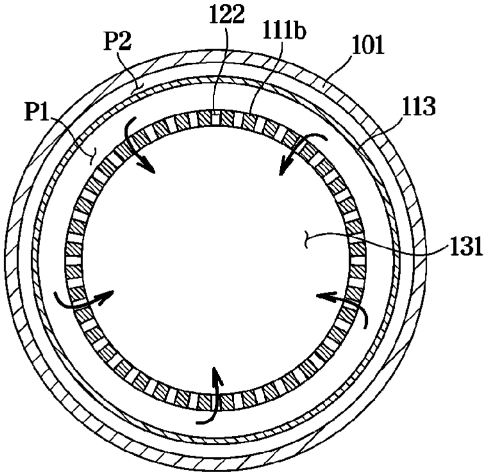
FIG. 6 is a cross-section taken along line B-B' shown in FIG. 3 according to an embodiment of the disclosure.

FIG. 3 is a view illustrating a portion of a cross section of a dust collector shown in FIG. 2 according to an embodiment of the disclosure. FIG. 4 is a view illustrating airflow inside a dust collector generated by a fan motor unit shown in FIG. 2 according to an embodiment of the disclosure. FIG. 5 is a cross-sectional view taken along line A-A' shown in FIG. 3 according to an embodiment of the disclosure. FIG. 6 is a cross-section taken along line B-B' shown in FIG. 3 according to an embodiment of the disclosure.

Referring to FIGS. 3 and 4, the dust collector 100 includes a housing 101, a rotating body 113 arranged inside the housing 101, and a fixed body 111 arranged inside the rotating body 113.

The housing 101 may form a part of the external appearance of the cleaner 1. The housing 101 may have a substantially cylindrical shape with a hollow. One end of the housing 101 connected to the suction head 10 may have an inlet 131*a*. The other end of the housing 101 coupled to the main body 30 may have an outlet 131*b*.

The dust collector 100 may include an opening and closing cover 60 configured to open and close a first dust collecting chamber 131. The opening and closing cover 60 may include a material having elasticity. The opening and closing cover 60 may open the inlet 131*a* by operating in a direction in which air is introduced into the first dust collecting chamber 131.

On the other hand, the opening and closing cover 60 may be provided not to operate in a direction opposite to the direction in which air is introduced to the first dust collecting chamber 131 when opening the inlet 131*a*. That is, when the cleaner 1 suctions rubbish or debris on the surface to be cleaned, the opening and closing cover 60 may open the inlet 131*a* without operating in the direction in which the dust is discharged from the first dust collecting chamber 131. Accordingly, in a state in which the dust collector 100 is separated from the suction head 10, dust is prevented from scattering.

The opening and closing cover 60 may include a cover hinge portion 60*a*. When the fan motor unit 40 generates a suction force, the opening and closing cover 60 may be elastically deformed with the cover hinge portion 60*a* fixed, so that the inlet 131*a* is opened. When the fan motor unit 40 does not generate a suction force, the opening and closing cover 60 may return to the position, in which the inlet 131*a* is closed, by the elastic force.

The rotating body 113 may be rotatably provided inside the housing 101. The rotating body 113 may be arranged between the fixed body 111 and the housing 101. The rotating body 113 may have a substantially cylindrical shape with a hollow. The rotating body 113 may be provided to be rotatable about a rotational axis that extends along a direction in which air introduced into the dust collector 100 is discharged. The rotating body 113 may be rotated by receiving power from a driving device 114.

Between the rotating body 113 and the fixed body 111, a first flow path P1 may be formed. Between the rotating body 113 and the housing 101, a second flow path P2 may be formed. As the rotating body 113 rotates, a difference in velocity between the rotating body 113 and the fixed body 111 occurs, so that lift is generated in a direction toward the rotating body 113. While air containing rubbish or debris is passing through the first flow path P1, the rubbish or debris may be separated from the air by the lift and collected to a side of the rotating body 113. As the rotating body 113 rotates, a difference in speed between the rotating body 113 and the housing 101 occurs, so that lift is generated in a direction toward the rotating body 113. While air containing rubbish or debris is passing through the second flow path P2, the rubbish or debris may be separated from the air by the lift and collected to a side of the rotating body 113.

The fixed body 111 may be arranged inside the rotating body 113. The fixed body 111 may be fixed to the housing 101. The fixed body 111 may have a substantially cylindrical shape with a hollow. The fixed body 111 may include a first fixed body 111*a* arranged between the driving device 114 and the inlet 131*a* and a second fixed body 111*b* arranged between the driving device 114 and the outlet 131*b*.

Referring to FIGS. 3 and 5, the first fixed body 111*a* may include a plurality of slits 121 formed through the outer circumferential surface of the first fixed body 111*a*. The plurality of slits 121 may extend in a direction parallel to the rotational axis direction of the rotating body 113. The plurality of slits 121 may be formed to be inclined with respect to the radial direction of the first fixed body 111*a*.

Referring to FIGS. 3 and 6, the second fixed body 111*b* may include a plurality of holes 122 formed through the outer circumferential surface of the second fixed body 111*b*. The plurality of holes 122 may be arranged along the circumference of the second fixed body 111*b* and may be arranged along the longitudinal direction of the second fixed body 111*b*.

The first dust collecting chamber 131 may be formed inside the first fixed body 111*a*. The first dust collecting chamber 131 may collect rubbish or debris filtered out through the plurality of slits 121 of the first fixed body 111*a*.

A second dust collecting chamber 132 may be formed outside the fixed body 111. The second dust collecting chamber 132 may be formed between the housing 101 and the first fixed body 111*a*. The second dust collecting chamber 132 may be formed outside the rotating body 113. The second dust collecting chamber 132 may store rubbish or debris collected on the rotating body 113 by the lift while air passes through the plurality of slits 121 of the first fixed body 111*a* is sequentially passing through the first flow path P1 and the second flow path P2.

A third dust collecting chamber 133 may be formed outside the fixed body 111. The third dust collecting chamber 133 may be formed between the housing 101 and the second fixed body 111*b*. The third dust collecting chamber 133 may be formed outside the rotating body 113. The third dust collecting chamber 133 may store rubbish or debris collected on the rotating body 113 by the lift while air is sequentially passing through the second flow path P2 and the first flow path P1 and introduced into the second fixed body 111*b*.

The air introduced into the second fixed body 111*b* may move to the main body 30 through the outlet 131*b*.

The second dust collecting chamber 132 may be formed on one side of the rotating body 113, and the third dust collecting chamber 133 may be formed on the other side opposite to the one side of the rotating body 113.

The dust collector 100 may include the driving device 114 provided to rotate the rotating body 113. The driving device 114 may include a driving source 115 provided to generate power for rotating the rotating body 113, and a power transmission member 116 for transmitting power generated from the driving source 115 to the rotating body 113.

The driving device 114 may be arranged between the first fixed body 111*a* and the second fixed body 111*b* of the fixed body 111. The driving device 114 may be provided to generate a rotational force according to a rotational axis parallel to the direction of the airflow flowing into the dust collector 100. The inlet 131*a*, the driving device 114, and the outlet 131*b* may be sequentially arranged in a line.

The driving source 115 may be provided as a motor. The driving source 115 may be connected to the rotating body 113 by the power transmission member 116. The rotational force of the driving source 115 may be transmitted to the rotating body 113 by the power transmission member 116. The driving source 115 may be fixed to the fixed body 111. The driving source 115 may be fixed to the housing 101.

The driving device 114 may adjust the rotation speed of the rotating body 113 such that the lift is greater than the centrifugal force generated according to rotation of the rotating body 113. Along a circumference of the rotating body 113, lift in a direction toward the rotating body 113 may be generated by the driving device 114. Accordingly, rubbish or debris included in the airflow passing through the first flow path P1 and the second flow path P2 formed around the rotating body 113 may be collected on the rotating body 113.

The dust collector 100 according to the embodiment of the disclosure is configured such that a part of the air passed through the first fixed body 111*a* flows through the first flow path P1 but another part of the air flows through the second flow path P2 between the rotating body 113 and the housing 101, so that the time for the air containing rubbish or debris to pass through the dust collector 100 may be increased and the dust collection efficiency may be increased. That is, the dust collector 100 may collect rubbish or debris not only from the first flow path P1 between the rotating body 113 and the fixed body 111 but also from the second flow path P2 between the rotating body 113 and the housing 101, and thus the dust collection efficiency may be increased.

In addition, because lift is proportional to the second power of the size of the rubbish or debris, and the centrifugal force is proportional to the third power of the size of the rubbish or debris, the centrifugal force decreases to a greater degree than the lift decreases, in response to the decreasing size of the rubbish or debris. Therefore, when the size of rubbish or debris is small, the conventional cyclone type dust collector using centrifugal force may have a great decrease in the dust collecting efficiency, compared to the dust collector 100 according to the embodiment of the disclosure that uses lift. In other words, the dust collector 100 according to the embodiment of the disclosure may more efficiently collect small-sized rubbish or debris compared to the cyclone type dust collector.

Figure 7:
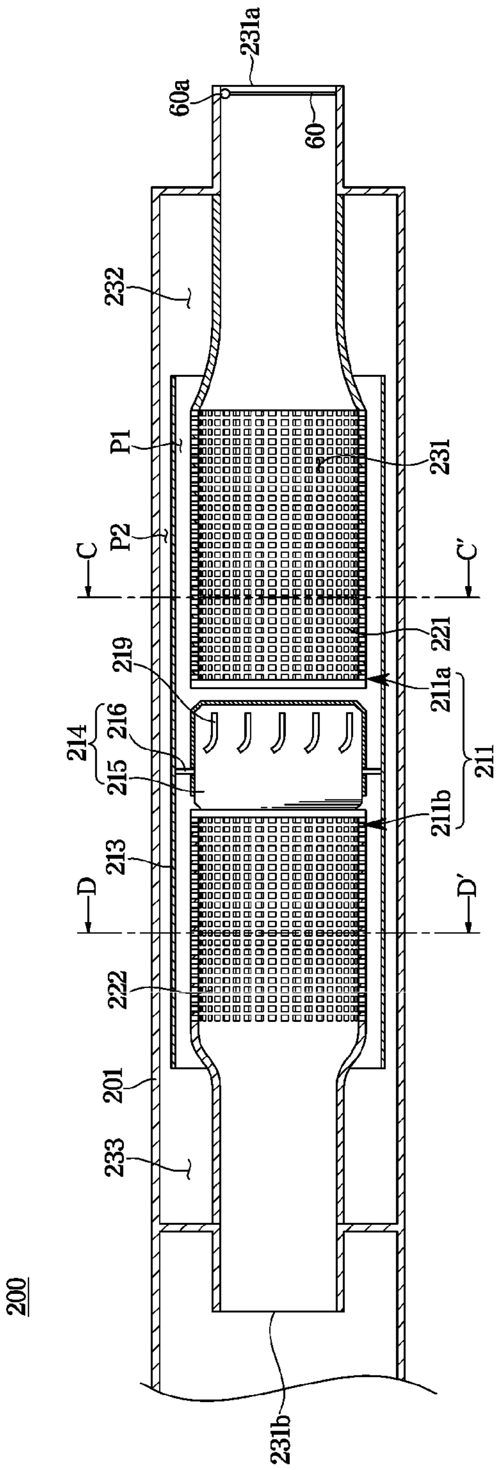
FIG. 7 is a view illustrating a portion of a cross-section of a dust collector according to an embodiment of the disclosure.
Figure 8:
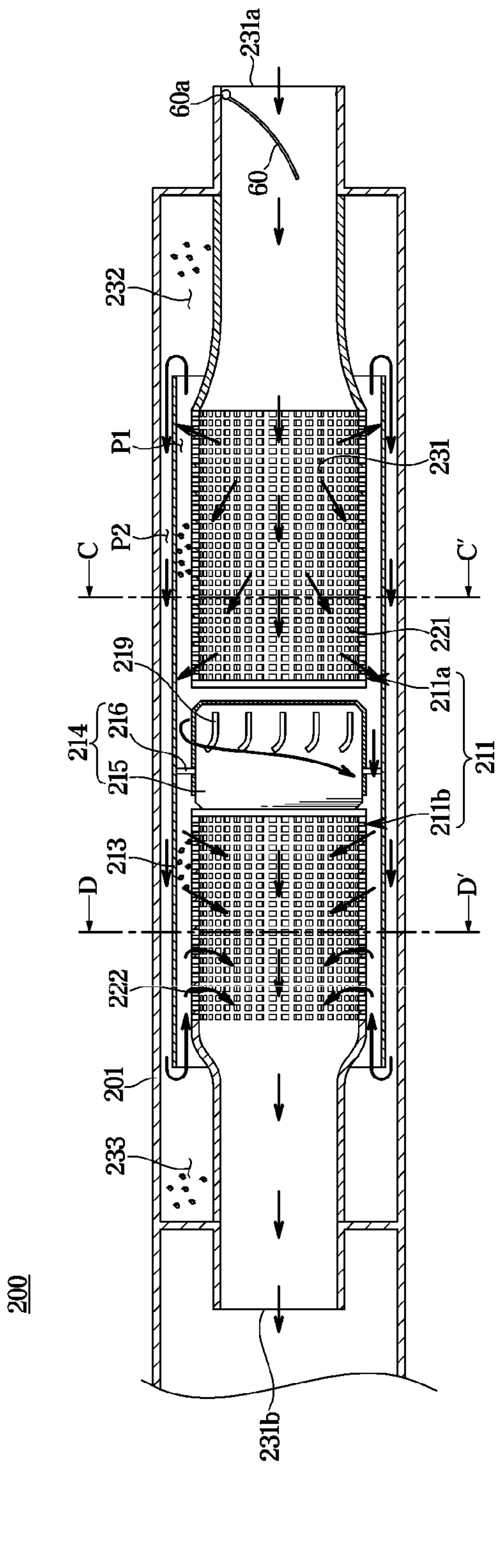
FIG. 8 is a view illustrating an airflow generated inside a dust collector shown in FIG. 7 according to an embodiment of the disclosure.
Figure 9:
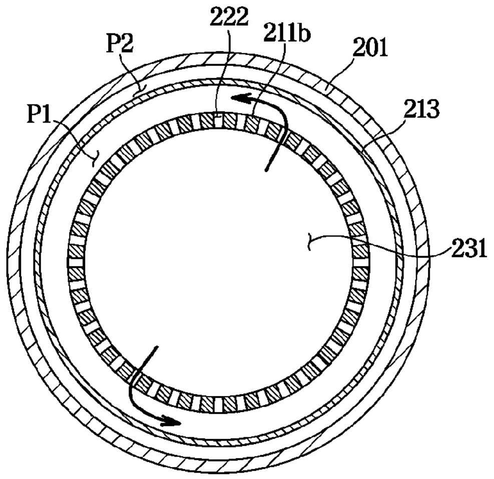
FIG. 9 is a cross-sectional view taken along line C-C' shown in FIG. 7 according to an embodiment of the disclosure.
Figure 10:
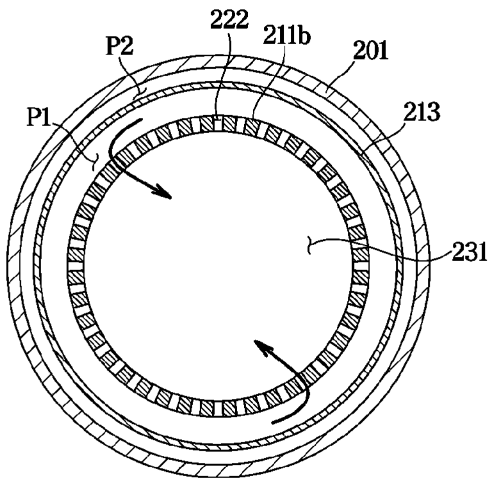
FIG. 10 is a cross-section taken along line D-D' shown in FIG. 7 according to an embodiment of the disclosure.

FIG. 7 is a view illustrating a portion of a cross-section of a dust collector according to an embodiment of the disclosure. FIG. 8 is a view illustrating an airflow generated inside a dust collector shown in FIG. 7 according to an embodiment of the disclosure. FIG. 9 is a cross-sectional view taken along line C-C' shown in FIG. 7 according to an embodiment of the disclosure. FIG. 10 is a cross-section taken along line D-D' shown in FIG. 7 according to an embodiment of the disclosure.

A dust collector 200 according to another embodiment of the disclosure will be described with reference to FIGS. 7 to 10. The same reference numerals are assigned to the same configurations as those in the embodiment described with reference to FIGS. 3 to 6, and detailed description thereof may be omitted.

Referring to 7 and 8, the dust collector 200 may include a housing 201, a rotating body 213 arranged inside the housing 201, and a fixed body 211 arranged inside the rotating body 213.

The housing 201 may have a substantially cylindrical shape with a hollow. The housing 201 may be provided with an inlet 231*a* and an outlet 231*b*.

The dust collector 200 may include an opening and closing cover 60 configured to open and close a first dust collecting chamber 231. Because the opening and closing cover 60 is the same as the opening and closing cover 60 shown in FIG. 3, detailed descriptions thereof will be omitted.

The rotating body 213 may be rotatably provided inside the housing 201. The rotating body 213 may be arranged between the fixed body 211 and the housing 201. The rotating body 213 may have a substantially cylindrical shape with a hollow. The rotating body 213 may be provided to be rotatable about a rotational axis extending along a direction in which air introduced into the dust collector 200 is discharged. The rotating body 213 may rotate by receiving power from a driving device 214.

Between the rotating body 213 and the fixed body 211, a first flow path P1 may be formed. Between the rotating body 213 and the housing 201, a second flow path P2 may be formed. As the rotating body 213 rotates, a difference in velocity between the rotating body 213 and the fixed body 211 occurs, so that lift in a direction toward the rotating body 213 is generated. While air containing rubbish or debris is passing through the first flow path P1, the rubbish or debris may be separated from the air by the lift and collected to a side of the rotating body 213. As the rotating body 213 rotates, a difference in velocity between the rotating body 213 and the housing 201 occurs, so that lift in a direction toward the rotating body 213 is generated. While air containing rubbish or debris is passing through the second flow path P2, the rubbish or debris may be separated from the air by the lift and collected to a side of the rotating body 213.

The fixed body 211 may be arranged inside the rotating body 213. The fixed body 211 may be fixed to the housing 201. The fixed body 211 may have a substantially cylindrical shape with a hollow. The fixed body 211 may include a first fixed body 211*a* arranged between the driving device 214 and the inlet 231*a* and a second fixed body 211*b* arranged between the driving device 214 and the outlet 231*b*.

The fixed body 211 may include a plurality of guides 219 arranged along the outer circumferential surface of the fixed body 211. The guides 219 may be formed to generate a spiral flow between the fixed body 211 and the rotating body 213. The guide 219 may have a curved shape. The guide 219 may be formed to generate a spiral flow in an airflow that does not pass through the second flow path P2.

Because the time for the air containing rubbish or debris to pass through the dust collector 200 is increased by the guide 219, the amount of rubbish or debris collected to the side of the rotating body 213 by the lift generated between the rotating body 213 and the fixed body 211 may be increased.

Referring to FIGS. 7 and 9, the first fixed body 211*a* may include a plurality of first holes 221 formed through the outer circumferential surface. The plurality of first holes 221 may be arranged along the circumference of the first fixed body 211*a* and may be arranged along the longitudinal direction of the first fixed body 211*a*.

Referring to FIGS. 7 and 10, the second fixed body 211*b* may include a plurality of second holes 222 formed through the outer circumferential surface of the second fixed body 211*b*. The plurality of second holes 222 may be arranged along the circumference of the second fixed body 211*b* and may be arranged along the longitudinal direction of the second fixed body 211*b*.

The first dust collecting chamber 231 may be formed inside the first fixed body 211*a*. The first dust collecting chamber 231 may collect the rubbish or debris filtered out through the plurality of first holes 221 of the first fixed body 211*a*.

A second dust collecting chamber 232 may be formed outside the fixed body 211. The second dust collecting chamber 232 may be formed between the housing 201 and the first fixed body 211*a*. The second dust collecting chamber 232 may be formed outside the rotating body 213. The second dust collecting chamber 232 may store rubbish or debris collected on the rotating body 213 by the lift while air passed through the plurality of holes 221 of the first fixed body 211*a* is sequentially passing through the first flow path P1 and the second flow path P2.

A third dust collecting chamber 233 may be formed outside the fixed body 211. The third dust collecting chamber 233 may be formed between the housing 201 and the second fixed body 211*b*. The third dust collecting chamber 233 may be formed outside the rotating body 213. The third dust collecting chamber 233 may store rubbish or debris collected on the rotating body 113 by the lift while air is sequentially passing through the second flow path P2 and the first flow path P1 and introduced into the second fixed body 211*b*.

The second dust collecting chamber 232 may be formed on one side of the rotating body 213, and the third dust collecting chamber 233 may be formed on the other side opposite to one side of the rotating body 213.

The dust collector 200 may include the driving device 214 provided to rotate the rotating body 213. The driving device 214 may include a driving source 215 provided to generate power for rotating the rotating body 213, and a power transmission member 216 for transmitting power generated from the driving source 215 to the rotating body 213.

The driving device 214 may be arranged between the first fixed body 211*a* and the second fixed body 211*b* of the fixed body 211. The driving device 214 may be provided to generate a rotational force according to a rotational axis parallel to the direction of the airflow flowing into the dust collector 200. The inlet 231*a*, the driving device 214, and the outlet 231*b* may be sequentially arranged in a line.

The driving source 215 may be provided as a motor. The driving source 215 may be connected to the rotating body 213 by the power transmission member 216. The rotational force of the driving source 215 may be transmitted to the rotating body 313 by the power transmission member 316. The driving source 215 may be fixed to the fixed body 211. The driving source 215 may be fixed to the housing 201.

The driving device 214 may adjust the rotation speed of the rotating body 213 such that lift is greater than the centrifugal force generated according to rotation of the rotating body 213. Along a circumference of the rotating body 213, lift in a direction toward the rotating body 213 may be generated by the driving device 214. Accordingly, rubbish or debris included in the airflow passing through the first flow path P1 and the second flow path P2 formed around the rotating body 213 may be collected on the rotating body 213.

The dust collector 200 according to the embodiment of the disclosure is configured such that a part of the air passed through the first fixed body 211*a* flows through the first flow path P1, but another part of the air flows through the second flow path P2 between the rotating body 213 and the housing 201, so that the time for air containing rubbish or debris to pass through the dust collector 200 may be increased, and the dust collection efficiency may be increased. That is, the dust collector 200 may collect rubbish or debris not only from the first flow path P1 between the rotating body 213 and the fixed body 211, but also from the second flow path P2 between the rotating body 213 and the housing 201, so that the dust collection efficiency may be increased.

Figure 11:
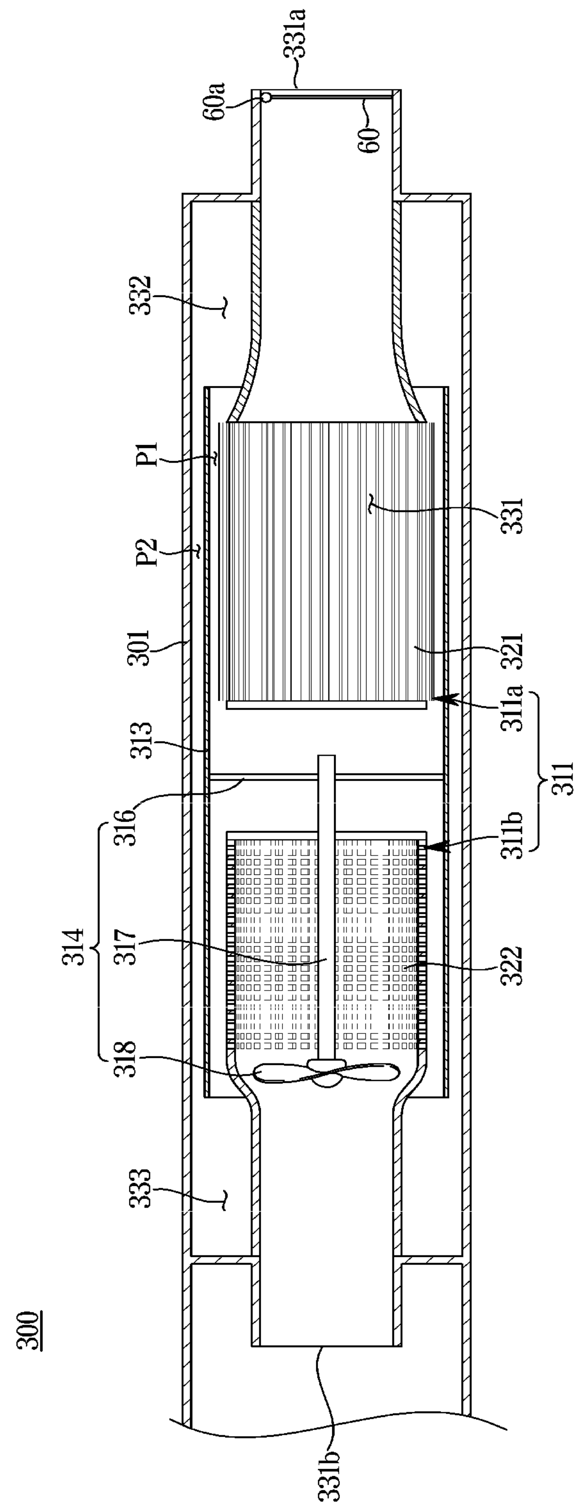
FIG. 11 is a view illustrating a portion of a cross-section of a dust collector according to an embodiment of the disclosure.

FIG. 11 is a view illustrating a portion of a cross-section of a dust collector according to an embodiment of the disclosure.

A dust collector 300 according to still another embodiment of the disclosure will be described with reference to FIG. 11. The same reference numerals are assigned to the same configurations as those in the embodiment described with reference to FIGS. 3 to 6, and detailed description thereof may be omitted.

Referring to FIG. 11, the dust collector 300 may include a housing 301, a rotating body 313 arranged inside the housing 301, and a fixed body 311 arranged inside the rotating body 313.

The housing 301 may have a substantially cylindrical shape with a hollow. The housing 301 may be provided with an inlet 331*a* and an outlet 331*b*.

The dust collector 300 may include an opening and closing cover 60 configured to open and close a first dust collecting chamber 331.

The rotating body 313 is rotatably provided inside the housing 301. The rotating body 313 may be arranged between the fixed body 311 and the housing 301. The rotating body 313 may have a substantially cylindrical shape with a hollow. The rotating body 313 may be provided to be rotatable about a rotational axis extending along a direction in which air introduced into the dust collector 300 is discharged. The rotating body 313 may rotate by receiving power from a driving device 314.

Between the rotating body 313 and the fixed body 311, a first flow path P1 may be formed. Between the rotating body 313 and the housing 301, a second flow path P2 may be formed. As the rotating body 313 rotates, a difference in velocity between the rotating body 313 and the fixed body 311 occurs, so that lift in a direction toward the rotating body 313 is generated. While air containing rubbish or debris is passing through the first flow path P1, the rubbish or debris may be separated from the air by the lift and collected to a side of the rotating body 313. As the rotating body 313 rotates, a difference in velocity between the rotating body 313 and the housing 301 occurs, so that lift in a direction toward the rotating body 313 is generated. While air containing rubbish or debris is passing through the second flow path P2, the rubbish or debris may be separated from the air by the lift and collected to a side of the rotating body 313.

The fixed body 311 may be arranged inside the rotating body 313. The fixed body 311 may be fixed to the housing 301. The fixed body 311 may have a substantially cylindrical shape with a hollow. The fixed body 311 may include a first fixed body 311*a* arranged between the driving device 314 and the inlet 331*a* and a second fixed body 311*b* arranged between the driving device 314 and the outlet 331*b*.

The first fixed body 311*a* may include a plurality of slits 321 formed through the outer circumferential surface of the first fixed body 311*a*. The plurality of slits 321 may be provided in the same manner as the plurality of slits 121 illustrated in FIGS. 3 and 5.

The second fixed body 311*b* may include a plurality of holes 322 formed through the outer circumferential surface of the second fixed body 311*b*. The plurality of holes 322 may be provided in the same manner as the plurality of holes 122 illustrated in FIGS. 3 and 6.

The first dust collecting chamber 331 may be formed inside the first fixed body 311*a*. The first dust collecting chamber 331 may collect rubbish or debris filtered out through the plurality of slits 321 of the first fixed body 311*a*.

A second dust collecting chamber 332 may be formed outside the fixed body 311. The second dust collecting chamber 332 may be formed between the housing 301 and the first fixed body 311*a*. The second dust collecting chamber 332 may be formed outside the rotating body 313. The second dust collecting chamber 332 may store rubbish or debris collected on the rotating body 313 by the lift while air passed through the plurality of slits 321 of the first fixed body 311*a* is sequentially passing through the first flow path P1 and the second flow path P2.

A third dust collecting chamber 333 may be formed outside the fixed body 311. The third dust collecting chamber 333 may be formed between the housing 301 and the second fixed body 311*b*. The third dust collecting chamber 333 may be formed outside the rotating body 313. The third dust collecting chamber 333 may store rubbish or debris collected on the rotating body 313 by the lift while air is sequentially passing through the second flow path P2 and the first flow path P1 and introduced into the second fixed body 311*b*.

The second dust collecting chamber 332 may be formed on one side of the rotating body 313, and the third dust collecting chamber 333 may be formed on the other side opposite to one side of the rotating body 313.

The dust collector 300 may include the driving device 314 provided to rotate the rotating body 313. The driving device 314 may include an impeller 318 provided to be rotatable by a suction force generated inside the dust collector 300, an impeller shaft 317 forming a rotation center of the impeller 318, and a power transmission member 316 connecting the impeller shaft 317 to the rotating body 313.

The impeller 318 may be arranged inside the fixed body 311. The impeller 318 may be arranged inside the second fixed body 311*b*. The impeller 318 may be provided to be rotatable according to discharge of air introduced into the second fixed body 311*b* through the plurality of holes 322.

The impeller 318 may be provided to generate a rotational force according to a rotational axis parallel to the direction of the airflow flowing into the dust collector 300. The inlet 331*a*, the impeller 318, and the outlet 331*b* may be sequentially arranged in a line.

As the impeller 318 rotates, the impeller shaft 317 may rotate, and the rotation of the impeller shaft 317 may cause the power transmission member 316 to be rotated. The impeller shaft 317 may be rotatably coupled to the fixed body 311.

As the power transmission member 316 rotates, the rotating body 313 may rotate. The power transmission member 316 may allow the rotational force of the impeller 318 to be transmitted to the rotating body 313.

Because the dust collector 300 according to the embodiment of the disclosure rotates the rotating body 313 using the impeller 318, the power consumption may be reduced.

The driving device 314 may adjust the rotation speed of the rotating body 313 such that lift is greater than the centrifugal force generated according to the rotation of the rotating body 313. Along a circumference of the rotating body 313, lift in a direction toward the rotating body 313 may be generated by the driving device 314. Accordingly, rubbish or debris included in the airflow passing through the first flow path P1 and the second flow path P2 formed around the rotating body 313 may be collected on the rotating body 313.

The dust collector 300 according to the embodiment of the disclosure is configured such that a part of the air passed through the first fixed body 311*a* flows through the first flow path P1, but another part flows through the second flow path P2 between the rotating body 313 and the housing 301, so that the time for the air containing rubbish or debris to pass through the dust collector 300 may be increased, and thus the dust collection efficiency may be increased. That is, the dust collector 300 may collect rubbish or debris not only from the first flow path P1 between the rotating body 313 and the fixed body 311 but also from the second flow path P2 between the rotating body 313 and the housing 301, so that the dust collection efficiency may be increased.

As is apparent from the above, the cleaner according to the aspect of the disclosure is configured to separate particles included in the gas using lift, so that the dust collection efficiency can be improved.

The cleaner according to the aspect of the disclosure is configured to separate particles contained in the gas by lift generated by a fixed first body and a rotating second body, so that reduction in the dust collection efficiency can be minimized even when the size of the particles is small.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A cleaner comprising:
a suction head;
a dust collector connected to the suction head; and
a fan motor provided to generate a suction force inside the dust collector,
wherein the dust collector comprises:
a housing having an inlet and an outlet,
a fixed body arranged inside the housing,
a rotating body rotatably provided between the housing and the fixed body, and covering an outer circumferential surface of the fixed body, and
a flow path formed between the fixed body and the rotating body,
wherein the fixed body comprises a dust collecting chamber formed inside the fixed body and connected to the inlet of the housing, and
wherein the fixed body is configured so that air inside the dust collecting chamber is discharged to the flow path through the outer circumferential surface of the fixed body.

2. The cleaner of claim 1, wherein the dust collector further comprises a driving device provided to generate a driving force for rotating the rotating body.

3. The cleaner of claim 2, wherein the driving device is configured to generate a torque according to a rotational axis that is parallel to a direction of an airflow flowing into the dust collector.

4. The cleaner of claim 2,
wherein the fixed body is a first fixed element which is arranged between the driving device and the inlet, and
wherein the dust collector further comprises:
a second fixed element arranged between the driving device and the outlet.

5. The cleaner of claim 4, wherein the inlet, the driving device, and the outlet are arranged in a line.

6. The cleaner of claim 2, wherein the driving device is provided to adjust a rotational speed of the rotating body such that lift is greater than a centrifugal force generated according to a rotation of the rotating body.

7. The cleaner of claim 1, wherein the rotating body is provided to rotate about a rotational axis that extends along a direction in which air flowing into the dust collector is discharged.

8. The cleaner of claim 1, wherein the fixed body comprises a plurality of holes formed through the outer circumferential surface of the fixed body.

9. The cleaner of claim 1, wherein the fixed body comprises a plurality of slits formed through the outer circumferential surface of the fixed body and extending parallel to a direction of a rotational axis of the rotating body.

10. The cleaner of claim 9, wherein the plurality of slits are formed to be inclined with respect to a radial direction of the fixed body.

11. The cleaner of claim 1, wherein the dust collector further comprises a guide provided on the fixed body to generate a spiral flow between the fixed body and the rotating body.

12. The cleaner of claim 1, wherein the dust collector further comprises an impeller that is provided to be rotated by the suction force of the fan motor to rotate the rotating body.

13. The cleaner of claim 1,
wherein the flow path is a first flow path, and
wherein the dust collector comprises:
a second flow path formed between the rotating body and the housing.

14. The cleaner of claim 1,
wherein the dust collecting chamber is a first dust collecting chamber, and
wherein the dust collector comprises:
a second dust collecting chamber formed outside the fixed body.

15. A dust collector comprising:
a housing having an inlet and an outlet;
a fixed body arranged inside the housing;
a rotating body rotatably provided between the housing and the fixed body, and covering an outer circumferential surface of the fixed body;
a flow path formed between the fixed body and the rotating body; and
a driving device provided to generate a driving force for rotating the rotating body,
wherein the fixed body comprises a dust collecting chamber formed inside the fixed body and connected to the inlet of the housing, and
wherein the fixed body is configured so that air inside the dust collecting chamber is discharged to the flow path through the outer circumferential surface of the fixed body.

* * * * *